(12) United States Patent
Arai (10) Patent No.: US 10,914,203 B2
(45) Date of Patent: Feb. 9, 2021

(54) INTERNAL COMBUSTION ENGINE

(71) Applicant: TOYOTA JIDOSHA KABUSHIKI KAISHA, Toyota (JP)

(72) Inventor: Takanobu Arai, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/741,793

(22) Filed: Jan. 14, 2020

(65) Prior Publication Data

US 2020/0240294 A1 Jul. 30, 2020

(30) Foreign Application Priority Data

Jan. 24, 2019 (JP) .................................. 2019-010428

(51) Int. Cl.
| | |
|---|---|
| *F01L 1/053* | (2006.01) |
| *F01L 1/02* | (2006.01) |
| *F01L 1/348* | (2006.01) |
| *F02F 1/24* | (2006.01) |
| *F16J 15/06* | (2006.01) |

(52) U.S. Cl.
CPC .............. *F01L 1/053* (2013.01); *F01L 1/024* (2013.01); *F01L 1/348* (2013.01); *F02F 1/24* (2013.01); *F16J 15/06* (2013.01); *F01L 2001/0537* (2013.01)

(58) Field of Classification Search
CPC ... F01L 1/024; F01L 2001/0476; F01L 1/053; F01L 1/344; F01M 9/102; F02F 1/24; F02F 7/006; F02F 11/002

USPC ................................ 123/90.17, 90.37, 90.38
See application file for complete search history.

(56) References Cited

U.S. PATENT DOCUMENTS

| 6,418,897 | B1* | 7/2002 | Urban | F01L 1/3442 |
| | | | | 123/90.17 |
| 2008/0047513 | A1* | 2/2008 | Schafer | F01L 1/34 |
| | | | | 123/90.17 |
| 2011/0030649 | A1* | 2/2011 | Nagao | F01L 1/053 |
| | | | | 123/196 R |
| 2011/0061616 | A1* | 3/2011 | Watanabe | F01L 1/024 |
| | | | | 123/90.15 |
| 2011/0174252 | A1* | 7/2011 | Tada | F01L 1/3442 |
| | | | | 123/90.15 |
| 2015/0275707 | A1* | 10/2015 | David | F01L 1/344 |
| | | | | 123/90.17 |
| 2016/0298505 | A1* | 10/2016 | Mitsutani | F01L 1/024 |

FOREIGN PATENT DOCUMENTS

JP          2018-131955 A     8/2018

* cited by examiner

*Primary Examiner* — Jorge L Leon, Jr.
(74) *Attorney, Agent, or Firm* — Oblon, McClelland, Maier & Neustadt, L.L.P.

(57) ABSTRACT

An internal combustion engine includes a cylinder head, a support structure, a cam pulley, and a seal member. The support structure is provided above the cylinder head and supports the camshaft. The cam pulley is provided at an end of the camshaft. A timing belt is wound around the cam pulley. A seal member is provided to cover a gap provided between the cylinder head and the support structure at a facing surface facing the cam pulley. The seal member provides sealing between the cylinder head and the support structure in an axial direction of the camshaft.

5 Claims, 11 Drawing Sheets

RELATED ART

FIG. 7

RELATED ART

FRONT END POSITION OF CYLINDER HEAD

FIG. 11

INTERNAL COMBUSTION ENGINE

INCORPORATION BY REFERENCE

The disclosure of Japanese Patent Application No. 2019-010428 filed on Jan. 24, 2019 including the specification, drawings and abstract is incorporated herein by reference in its entirety.

BACKGROUND

1. Technical Field

The disclosure relates to an internal combustion engine.

2. Description of Related Art

A timing belt is known as means for transmitting driving force from a crankshaft to a camshaft in an Over Head Valve (OHV) internal combustion engine. The timing belt is made of synthetic rubber, for example, and is more excellent in noise characteristics than a timing chain. On the other hand, the timing belt is more easily deteriorated than the timing chain, and thus is required to be periodically replaced. One of causes of deterioration of the timing belt may include adhesion of a lubricating oil of the internal combustion engine.

Japanese Patent Application Publication No. 2018-131955 discloses an OHV internal combustion engine that includes a timing belt. The timing belt is accommodated in a belt chamber. A lubricating oil flows from the internal combustion engine into the belt chamber. However, this internal combustion engine of the related art has a groove formed on a surface of a cam pulley around which the timing belt is wound. This groove allows the lubricating oil adhering to the surface of the cam pulley to be discharged to the outside of the belt chamber.

SUMMARY

From the viewpoint of suppressing deterioration of the timing belt, it is difficult to say that the configuration of the related art that allows inflow of the lubricating oil into the belt chamber is optimal. In this regard, the configuration that reduces inflow of the lubricating oil into the belt chamber can reduce adhesion of the lubricating oil to the timing belt.

As a lubricating oil that may adhere to a timing belt, attention is focused on a lubricating oil provided in a cylinder head. In an OHV internal combustion engine, generally, leakage of a lubricating oil to the outside of a cylinder head is reduced by providing sealing between the cylinder head and a camshaft support member provided above the cylinder head.

Unfortunately, the sealing between them has the following problems. That is, sealing between the cylinder head and the camshaft support member is generally provided in a height direction (up-down direction) (in other words, sealing between the cylinder head and the camshaft support member in the height direction is generally provided). However, since a cam pulley has a certain outer diameter, when the internal combustion engine is viewed in the longitudinal direction of the cylinder head, a seal surface is positioned within a range defined by the outer diameter of the cam pulley. Therefore, the position of the cam pulley cannot be shifted toward the cylinder head. That is, the size of the internal combustion engine including the cam pulley cannot be reduced.

The disclosure provides a novel internal combustion engine that makes it possible to restrain a lubrication oil provided in a cylinder head from adhering to a timing belt. The disclosure provides an internal combustion engine that makes it possible to reduce the overall size thereof including a cam pulley.

One aspect of the disclosure relates to an internal combustion engine. The internal combustion engine includes a cylinder head, a support structure, a cam pulley, and a seal member. The support structure is provided above the cylinder head. The support structure supports the camshaft. The cam pulley is provided at an end of the camshaft. A timing belt is wound around the cam pulley. A seal member is provided to cover a gap provided between the cylinder head and the support structure at a facing surface facing the cam pulley. The seal member provides sealing between the cylinder head and the support structure in the axial direction of the camshaft.

With the above aspect, the seal member that provides sealing between the cylinder head and the support structure in the axial direction of the camshaft is used. Therefore, it is possible to provide a novel internal combustion engine that makes it possible to reduce leakage of the lubricating oil from the gap provided (formed) between the cylinder head and the support structure. In particular, in the internal combustion engine of related art in which sealing between the cylinder head and the support structure is directly performed in the height direction (up-down direction) (in other words, sealing between the cylinder head and the support structure in the height direction is provided), it is practically difficult to increase the area of the seal surface. On the other hand, according to the first aspect, the area of the seal surface can be increased by increasing the area of the seal member. Accordingly, it is possible to ensure the sufficient sealing performance between the cylinder head and the support structure, and thus, it is possible to appropriately reduce the leakage of the lubricating oil.

In the above aspect, the support structure may include a facing member forming a part of the facing surface. The facing member may include a support portion and an outer peripheral portion. The support portion may support the camshaft from a side of the cylinder head. The outer peripheral portion may be provided to extend along an outer periphery of the support portion. A seal surface may be provided between the seal member and the outer peripheral portion. The seal surface may be provided at a position at which the seal surface does not interfere with the cam pulley in the axial direction of the camshaft. In a surface of the support portion, at least a region facing the cam pulley may be recessed from the seal surface in the axial direction of the camshaft. At least a part of the cam pulley may be provided in a recessed space of the support portion.

With the above configuration, in the surface of the support portion, at least the region facing the cam pulley is recessed from the seal surface in the axial direction of the camshaft, and at least a part of the cam pulley is provided in the recessed space. Accordingly, the overall size of the internal combustion engine including the cam pulley can be reduced.

In the above aspect, the internal combustion engine may further include an oil seal. The oil seal may be provided on an outer periphery of the end of the camshaft. The seal member may include an oil seal retainer that holds the oil seal. The oil seal retainer may include a holding portion and a fixing portion. The holding portion may be provided on an outer periphery of the oil seal. The fixing portion may be provided on an outer periphery of the holding portion. The fixing portion may be fixed to the facing surface. A seal surface may be provided between the fixing portion and the cylinder head. The seal surface may be provided at a position at which the seal surface does not interfere with the cam pulley in the axial direction of the camshaft. In a surface of the holding portion, at least a region facing the cam pulley may be recessed from the seal surface in the axial direction of the camshaft. At least a part of the cam pulley may be provided in a recessed space of the holding portion.

With the above configuration, in the surface of the holding portion, at least the region facing the cam pulley is recessed from the seal surface in the axial direction of the camshaft, and at least a part of the cam pulley is provided in the recessed space. Accordingly, the overall size of the internal combustion engine including the cam pulley can be reduced.

In the above aspect, the cam pulley may have a function of adjusting a valve timing.

In the case in which the cam pulley has a function of adjusting the valve timing, that is, in the case in which the cam pulley includes a Variable Valve Timing (VVT), the size of the internal combustion engine is more likely to increase in the axial direction of the camshaft. In this regard, with the above configuration, even when the VVT is applied, the overall size of the internal combustion engine can be reduced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the drawings. Note that, when the number, quantity, amount, range, etc., of each element are stated in the embodiments, the disclosure is not limited to the stated number and the like, unless the number and the like are specified or clearly specified in principle. Further, the structures, steps, and the like described in the embodiments below are not necessarily essential to the disclosure unless the structure and the like are specified or clearly specified in principle.

First, a first embodiment of the disclosure will be described with reference to FIG. 1 to FIG. 8.

Figure 1:
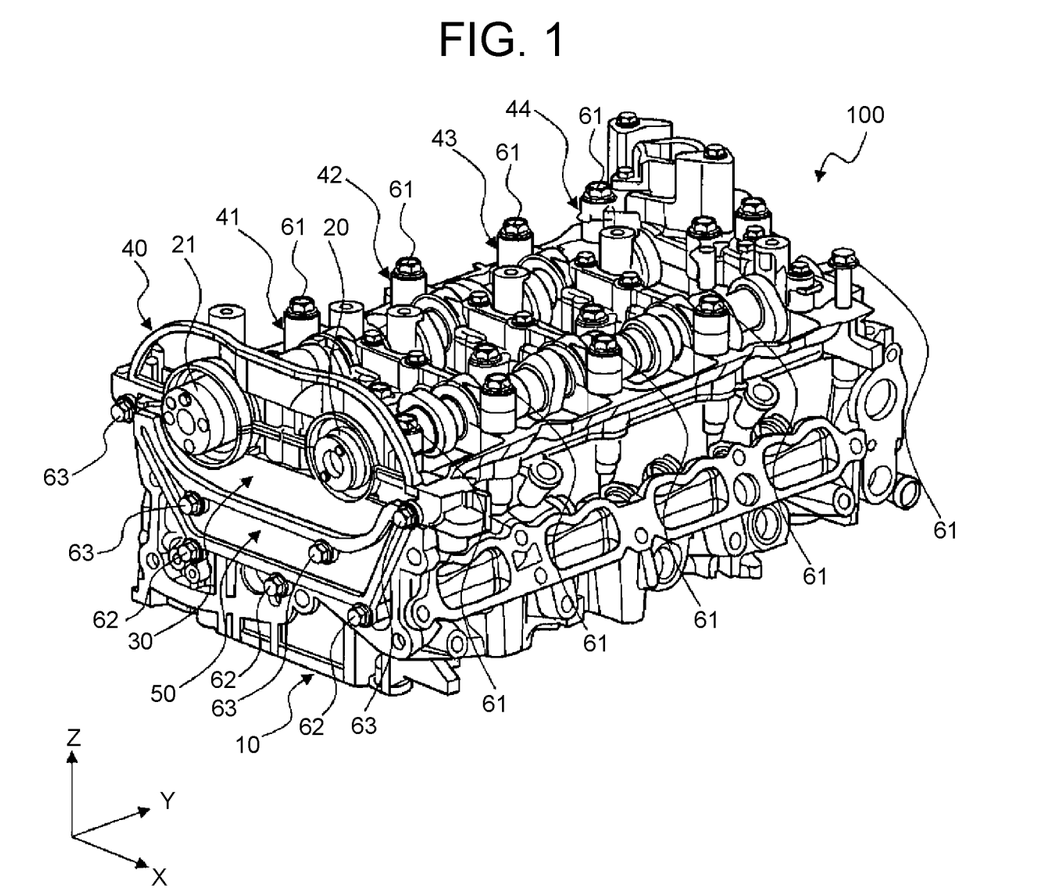
FIG. 1 is a perspective view showing a main part of an internal combustion engine according to a first embodiment of the disclosure.
Figure 2:
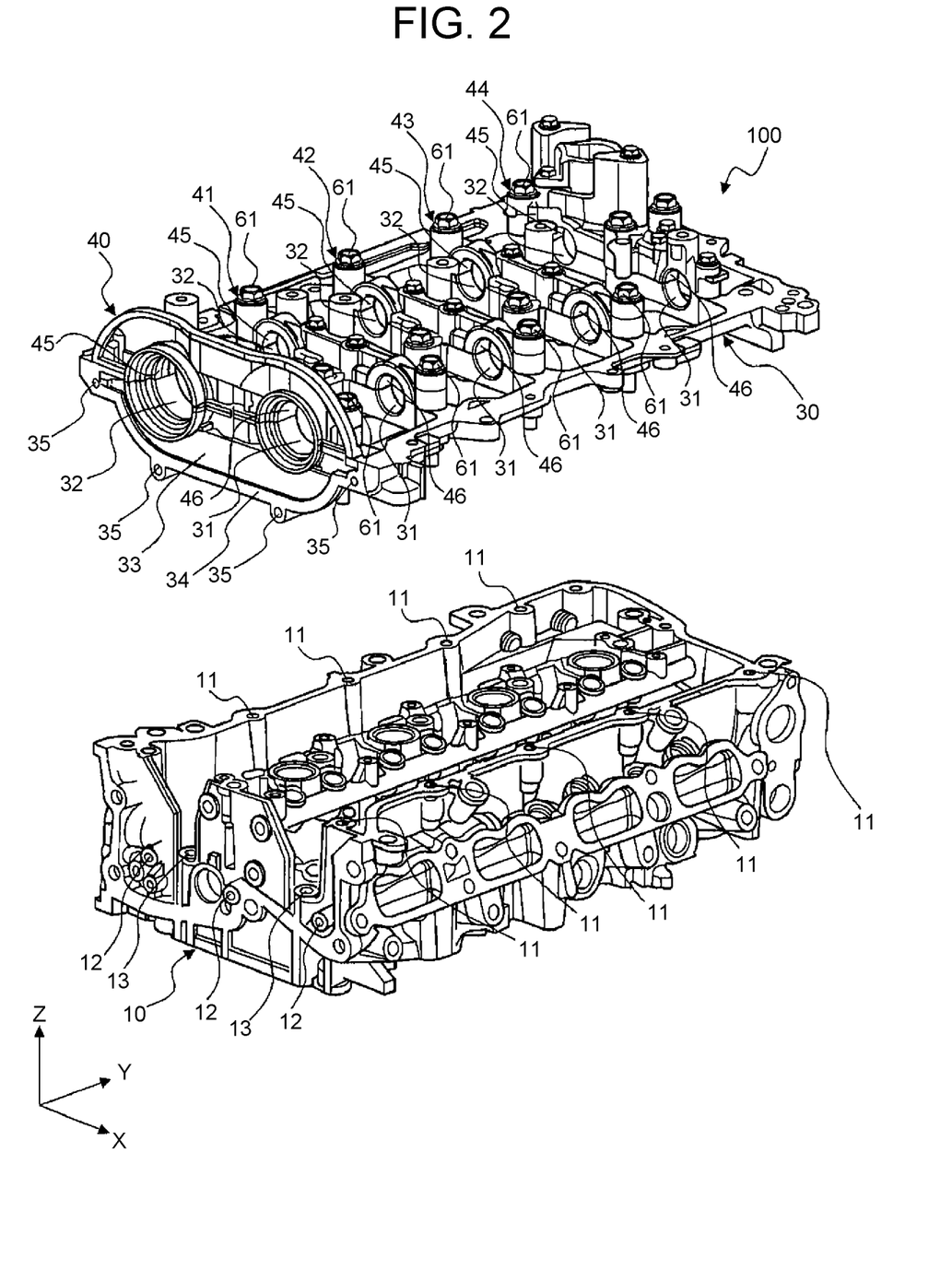
FIG. 2 is a perspective view showing a cylinder head, a cam housing, and a cam cap shown in FIG. 1.
Figure 3:
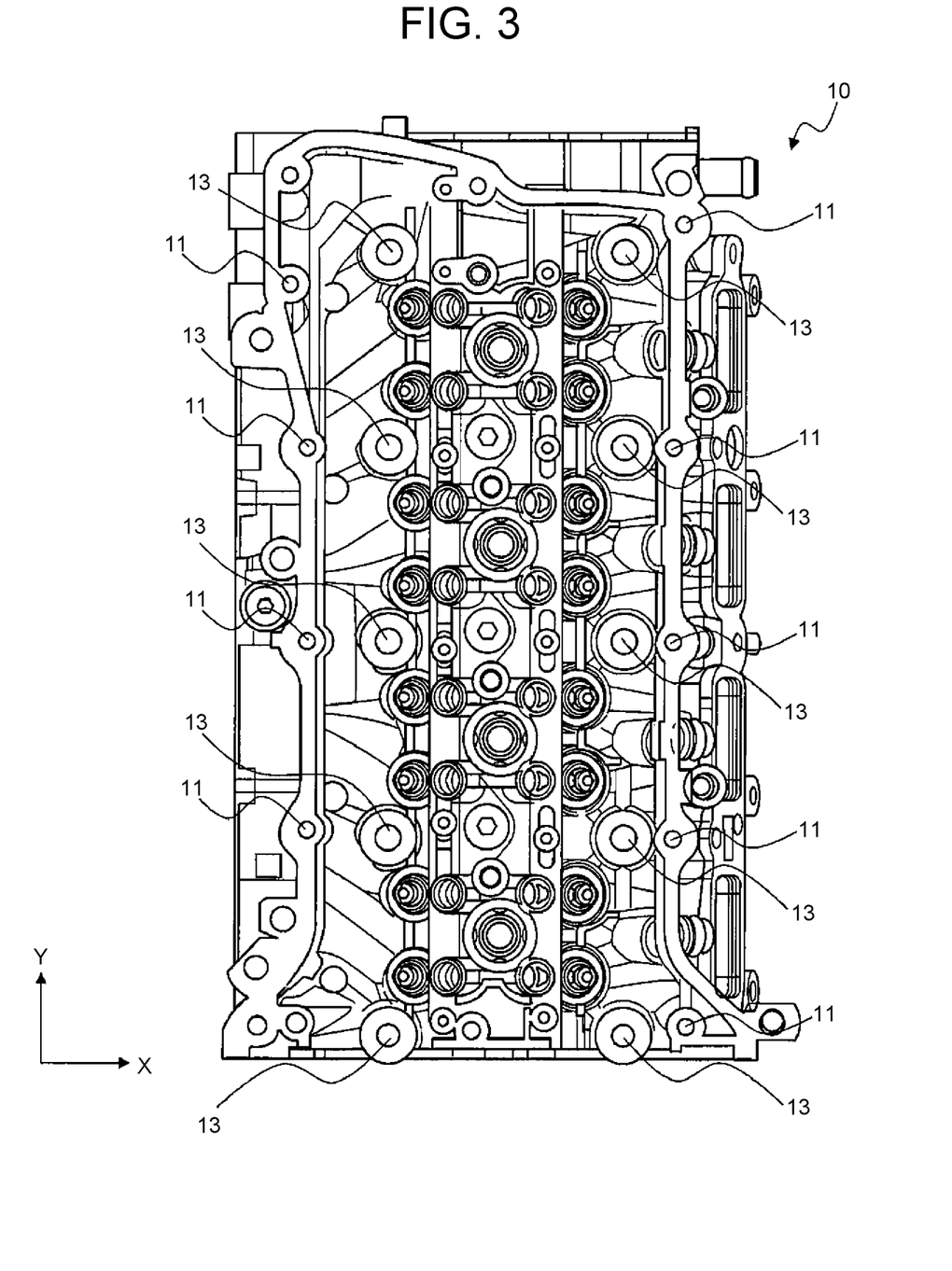
FIG. 3 is a plan view of the cylinder head shown in FIG. 1.
Figure 4:
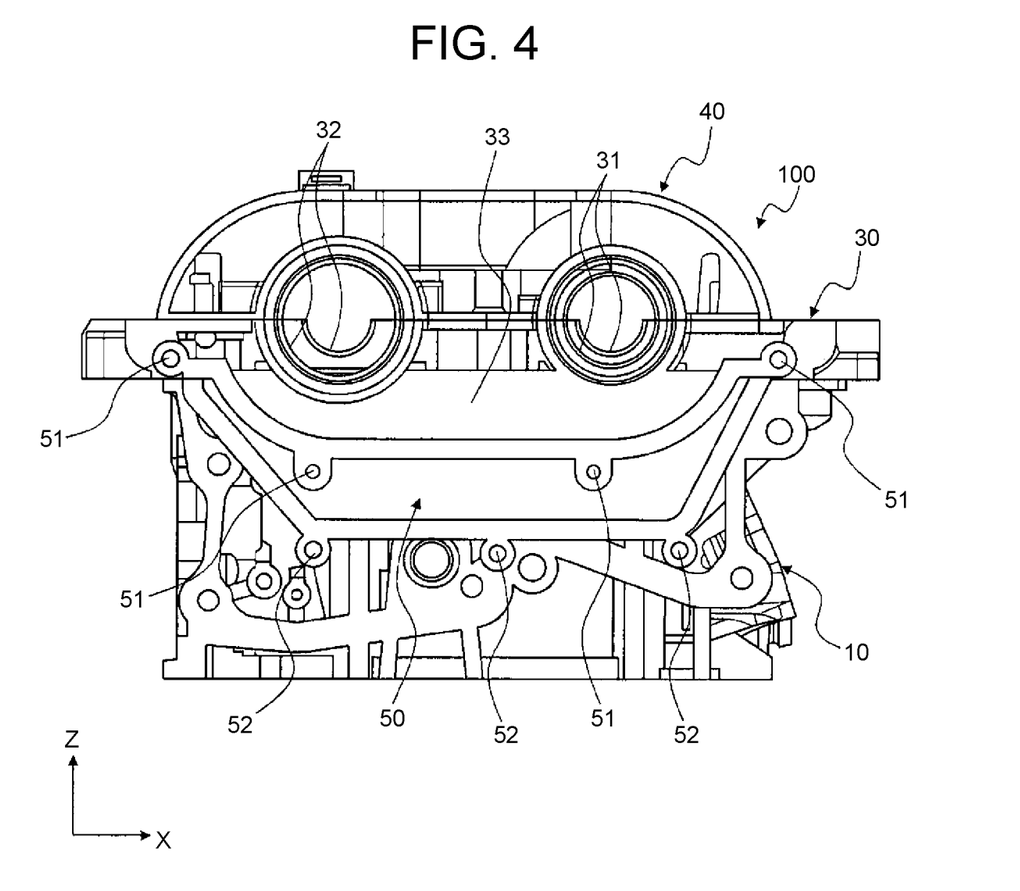
FIG. 4 is a side view of the internal combustion engine shown in FIG. 1.

The configuration of an internal combustion engine (hereinafter, also simply referred to as an "engine") will be described. The basic configuration thereof is as follows. The engine according to the first embodiment is a Double Over Head Valve (DOHV) engine mounted in a movable body, such as a vehicle. FIG. 1 is a perspective view showing a main part of the engine according to the first embodiment. FIG. 2 is a perspective view showing a cylinder head, a cam housing, and a cam cap shown in FIG. 1. FIG. 3 is a plan view of the cylinder head shown in FIG. 1. FIG. 4 is a side view of the engine shown in FIG. 1. In FIG. 1 to FIG. 4, the x-axis direction corresponds to the intake-exhaust direction, the y-axis direction corresponds to the axial direction of the camshaft, and the z-axis direction corresponds to the height direction (up-down direction). In the following description, the positive direction of the z-axis is defined as the upward direction, and the negative direction thereof is defined as the downward direction.

As shown in FIG. 1 to FIG. 3, an engine 100 includes a cylinder head 10, camshafts 20, 21, a cam housing 30, cam caps 40 to 44, and a cover member 50. The engine 100 is an in-line four-cylinder engine. Note that the number and alignment of the cylinders of the engine 100 are not limited to the above-described number and alignment.

As shown in FIG. 2 and FIG. 3, the cylinder head 10 has a plurality of bolt holes 11, 12, 13. Bolts 61 (see FIG. 1) are fitted into the respective bolt holes 11 from the side of the cam housing 30. The bolts 61 fasten the cylinder head 10, the cam housing 30, and the cam caps 40 to 44 together. Bolts 62 (see FIG. 1) are fitted into the respective bolt holes 12 from the side of the cover member 50. The bolts 62 fasten the cylinder head 10 and the cover member 50 together. Bolts 64 (see FIG. 5) are fitted into respective bolt holes 13 from the side of the cylinder head 10. The bolts 64 fasten the cylinder head 10 and a cylinder block (not shown) together.

The camshaft 20 is, for example, an intake camshaft. An electric Variable Valve Timing (VVT) 70 (see FIG. 5) is attached to an end of the camshaft 20. The camshaft 21 is an exhaust camshaft, for example. A hydraulic Variable Valve Timing (VVT) is attached to an end of the camshaft 21. A timing belt 71 (see FIG. 5) is wound around the outer peripheries of these VVTs. Note that the method of driving the VVTs is not limited to the above-described methods. Moreover, it is not always necessary to attach these VVTs to these ends. In this case, cam pulleys may be used instead of the VVTs.

The cam housing 30 supports the camshafts 20, 21 from the side of the cylinder head 10. As shown in FIG. 2, the cam housing 30 is provided with bearings 31 each of which supports a journal of the camshaft 20, and bearings 32 each of which supports a journal of the camshaft 21.

Here, attention is focused on a member of the cam housing 30, the member forming a surface where the engine faces the VVTs (hereinafter, also referred to as a "VVT facing surface"). As shown in FIG. 2, the facing member includes a support portion 33 provided with the bearings 31, 32; and an outer peripheral portion 34. The outer peripheral portion 34 is provided to extend along the outer periphery of the support portion 33. The thickness of the outer peripheral portion 34 in the y-axis direction is thicker than the thickness of the support portion 33 in the y-axis direction. A plurality of bolt holes 35 are formed in the outer peripheral portion 34. A plurality of bolts 63 (see FIG. 1) are fitted into the bolt holes 35 from the side of the cover member 50.

Figure 5:
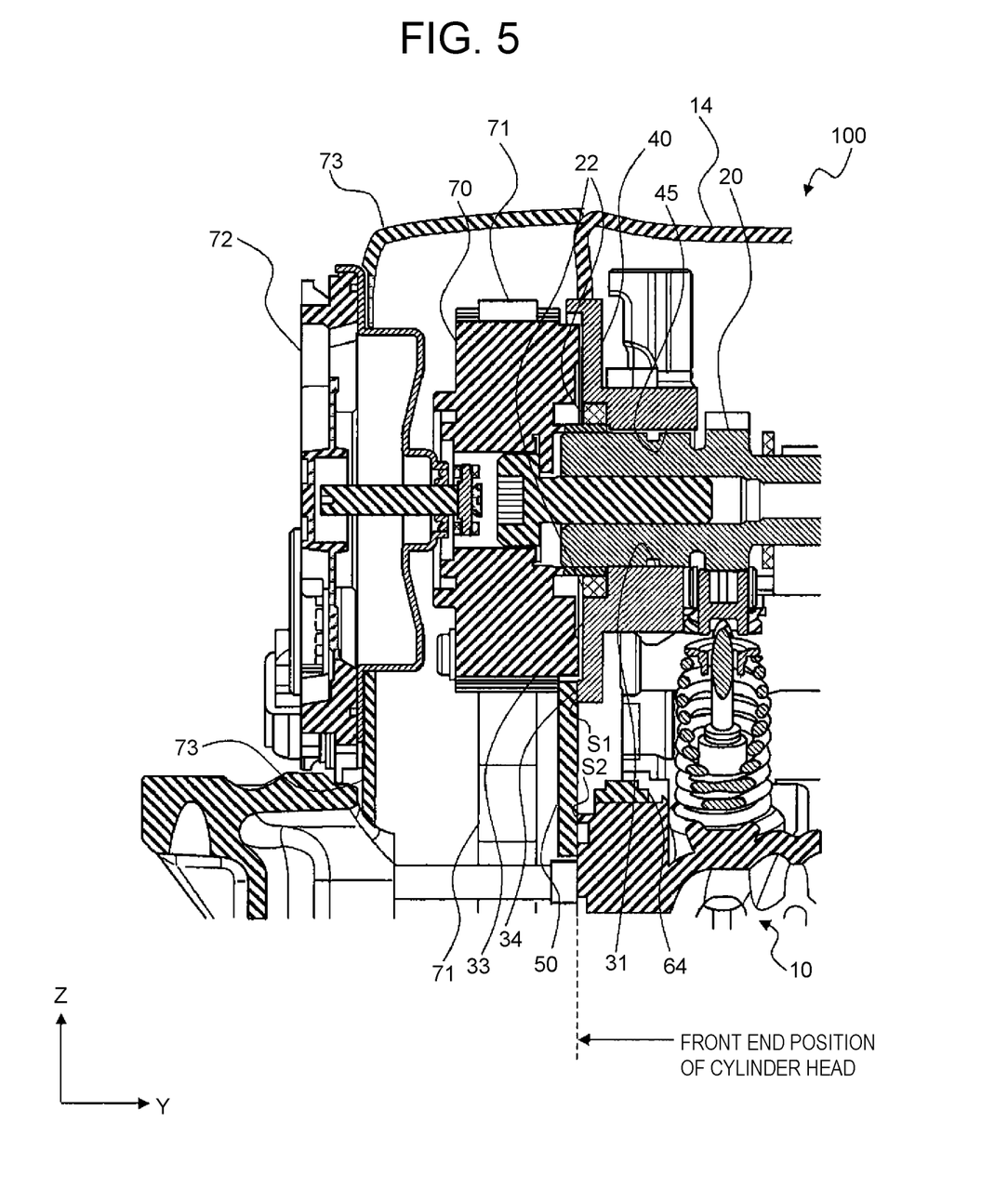
FIG. 5 is a schematic sectional view showing an end of a camshaft to which a VVT is provided, and a portion in the vicinity of the end of the camshaft.

The cam caps 40 to 44 support the camshafts 20, 21 from the side of the cylinder head cover 14 (see FIG. 5). As shown in FIG. 2, each of the cam caps 40 to 44 is provided with a bearing 45 supporting the journal of the camshaft 20, and a bearing 46 supporting the journal of the camshaft 21. The cam caps 40 to 44 are combined with the cam housing 30 to form a "support structure" that supports the camshafts 20, 21.

At the VVT facing surface, a gap is formed between the cylinder head 10 and the cam housing 30. The cover member 50 is a plate-shaped member that covers this gap. As shown in FIG. 4, the cover member 50 has a plurality of bolt holes 51, 52. The bolts 62 are fitted into the respective bolt holes 51. The center of each bolt hole 51 coincides with the center of the corresponding bolt hole 35 (see FIG. 2). The bolts 63 are respectively fitted into the bolt holes 52. The center of each bolt hole 52 coincides with the center of the corresponding bolt hole 12 (see FIG. 2).

Description will be provided on the configuration in which the VVT is attached to the camshaft. FIG. 5 is a schematic sectional view showing the end of the camshaft to which the VVT is attached and a portion in the vicinity of the end of the camshaft. In FIG. 5, attention is focused on the camshaft 20 shown in FIG. 1. Note that the manner of attaching the VVT at the end of the camshaft 21 is basically the same as the manner of attaching the VVT at the end of the camshaft 20 described below.

As shown in FIG. 5, the VVT 70 is attached to the end of the camshaft 20. The VVT 70 is driven by an electric motor 72 to change a phase angle of the camshaft 20 with respect to the crankshaft (not shown). The timing belt 71 is wound around the outer periphery of the VVT 70. When the VVT 70 is a hydraulic VVT, the VVT 70 is driven by a hydraulic control valve instead of the electric motor 72. The timing belt 71 transmits driving force of the engine 100 to the camshaft 20 via the crankshaft. The timing belt 71 is accommodated in the belt chamber 73.

An oil seal 22 is provided between the end of the camshaft 20 and the support portion 33. The oil seal 22 is a ring-shaped member that prevents a lubricating oil provided in the cylinder head cover 14 from leaking to the outside of the cylinder head cover 14 via a gap formed between the end of the camshaft 20 and the support portion 33 (or the cam cap 40).

An upper end of the cover member 50 is in contact with the outer peripheral portion 34 via a liquid gasket, for example. This contact surface forms a seal surface S1 between the cover member 50 and the cam housing 30 (in other words, the seal surface S1 is provided between the cover member 50 and the cam housing 30). Further, a lower end of the cover member 50 is in contact with the cylinder head 10 via a liquid gasket, for example. This contact surface forms a seal surface S2 between the cover member 50 and the cylinder head 10 (in other words, the seal surface S2 is provided between the cover member 50 and the cylinder head 10). Since the seal surfaces S1, S2 are formed, the gap formed between the cylinder head 10 and the cam housing 30 (a space in which the bolt 64 is accommodated in the example of FIG. 5) is sealed. That is, the cover member 50 also functions as a seal member.

As can be seen from FIG. 5, the seal surface S1 is formed below the VVT 70. In addition, a region in the surface of the support portion 33 is recessed from the seal surface S1 in the positive direction of the y-axis. The region is located above the seal surface S1 (hereinafter, the region is also referred to as a "region inward of the seal surface S1"). A part of the VVT 70 is provided in this recessed space. That is, in the engine 100, a part of the VVT 70 is located inward of the surface of the cover member 50 facing the timing belt 71.

Moreover, as can be seen from FIG. 5, a partial region in the surface of the cam cap 40 is recessed from the seal surface S1 in the positive direction of the y-axis. A part of the VVT 70 is also provided in this recessed space. In the y-axis direction, the position of the recessed region of the cam cap 40 is the same as the position of the region inward of the seal surface S1, for example.

Figure 6:
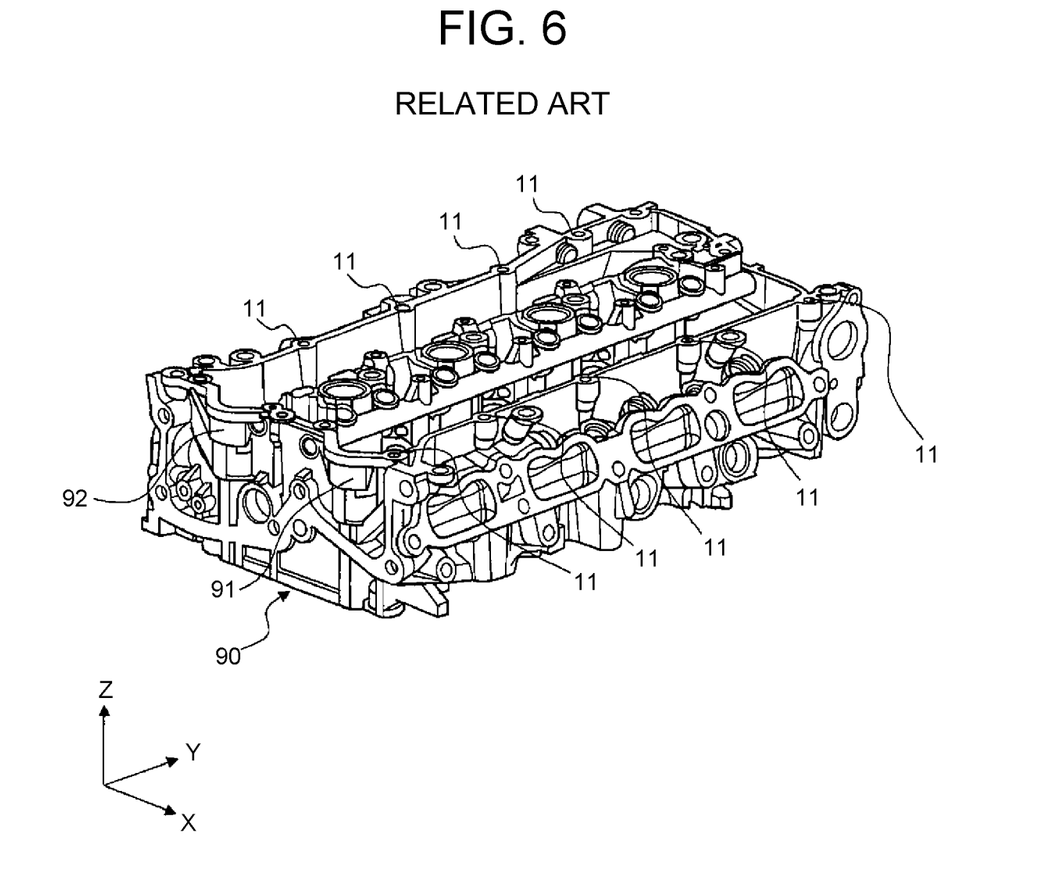
FIG. 6 is a perspective view showing a main part of a cylinder head of an internal combustion engine of related art.
Figure 7:
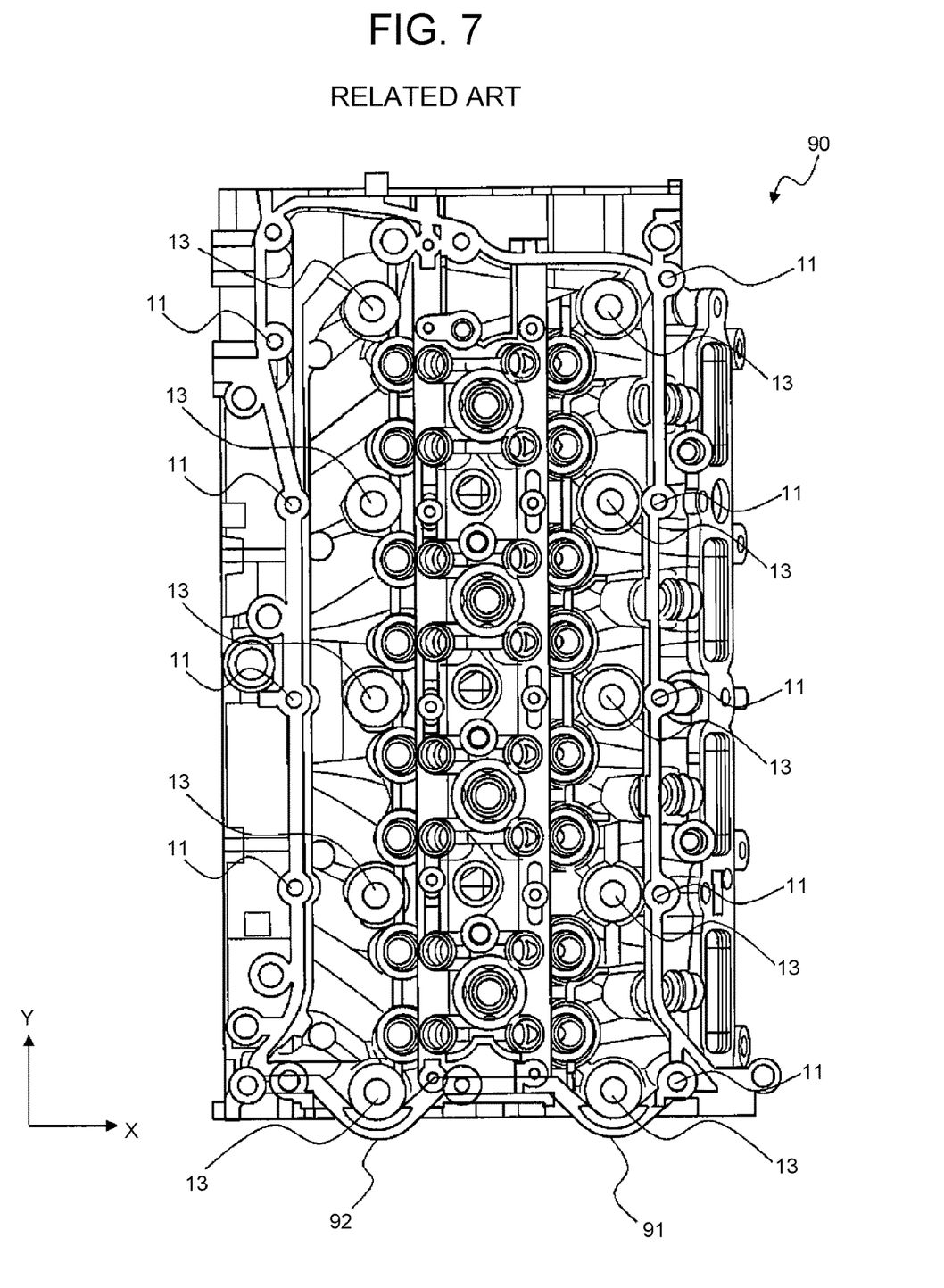
FIG. 7 is a plan view of the cylinder head shown in FIG. 6.
Figure 8:
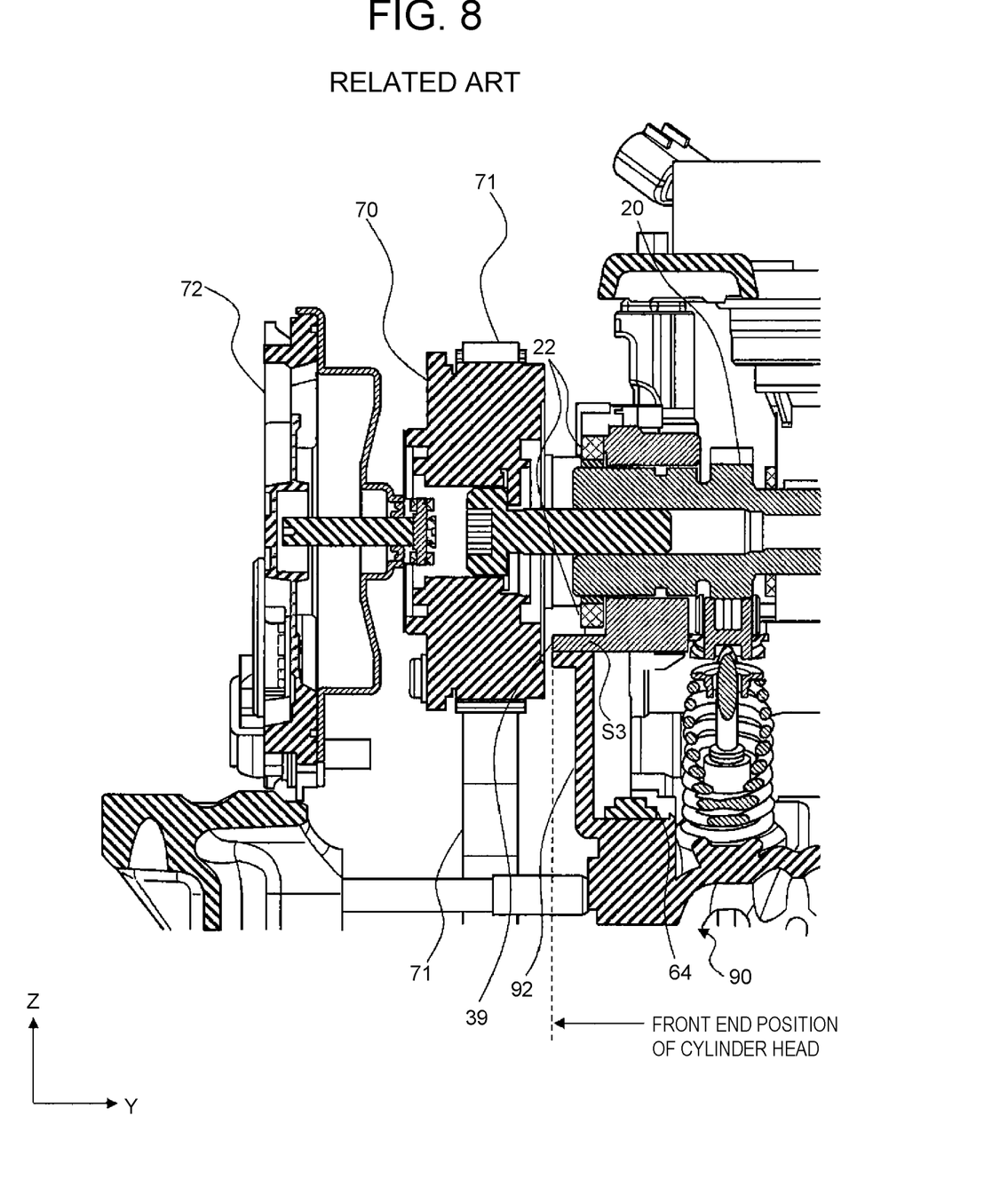
FIG. 8 is a schematic sectional view showing an end of a camshaft of the related art to which a VVT is provided, and a portion in the vicinity of the end of the camshaft.

Effects obtained by the configuration of the engine will be described. First, description will be provided on problems in the configuration of related art. FIG. 6 is a perspective view showing a main part of a cylinder head of an engine of the related art. FIG. 7 is a plan view of the cylinder head shown in FIG. 6. FIG. 8 is a schematic sectional view showing a main part when a VVT is attached to a camshaft of the engine of the related art. The respective directions of the x-axis, the y-axis, and the z-axis shown in FIG. 6 to FIG. 8 are the same as the respective directions of the axes shown in FIG. 1 to FIG. 4.

As shown in FIG. 6 to FIG. 8, a cylinder head 90 of the related art has seal portions 91, 92 on a VVT facing surface. A gap formed between the cylinder head 90 and the cam housing 39 (in the example of FIG. 8, a space in which the bolt 64 is accommodated) is sealed by the seal portions 91, 92. However, in order to secure seating surfaces for the bolts 64 (see FIG. 8) closest to the seal portions 91, 92, each of the seal portions 91, 92 has a shape curved along the outer periphery of the bolt hole 13 into which the bolt 64 is fitted.

Further, as shown in FIG. 8, the cylinder head 90 is provided with a seal surface S3 between the seal portion 92 and the cam housing 39. However, when the engine of the related art is viewed in the y-axis direction, the seal surface S3 is located within a range defined by the outer diameter of the VVT 70. Therefore, it is difficult to shift the front end position (i.e., the position of the front end) of the cylinder head 90 in the direction toward the inner side of the engine. This problem can be solved by reducing the area of the seal surface S3. However, the sealing performance between the seal portion 92 and the cam housing 39 cannot be ensured by this configuration.

Advantageous effects of the configuration as compared with the configuration of the related art will be described. In this regard, with the configuration of the engine 100 including the cover member 50, the sealing between the cylinder head and the cam housing is performed in the y-axis direction (i.e., the sealing between the cylinder head and the cam housing in the y-axis direction is provided). Therefore, it is possible to secure the sufficient area of the seal surface (that is, the area of the seal surfaces S1, S2) as compared to the configuration of the engine of the related art in which the sealing between the cylinder head and the cam housing is directly performed in the z-axis direction (in other words, the sealing between the cylinder head and the cam housing in the z-axis direction is provided). Therefore, it is possible to reliably ensure the sufficient sealing performance between the cylinder head and the cam housing, and thus, it is possible to appropriately reduce leakage of the lubricating oil from the gap formed between the cylinder head and the cam housing.

In addition, with the configuration in which the facing member including the support portion 33 and the outer peripheral portion 34 is provided, the seal surface 51 can be formed at a position at which the seal surface S1 does not interfere with the VVT 70 in the y-axis direction. Hence, since the region inward of the seal surface S1 is recessed from the seal surface S1 in the positive direction of the y axis, the position of the surface of the VVT 70 facing the cam housing 30 can be shifted in the direction toward the inner side of the engine 100 from the front end position (i.e., the position of the front end) of the cylinder head 10 (see FIG. 5). Therefore, it is possible to reduce the overall size of the engine including the VVT.

Note that the degree of recess is easily adjusted by adjusting the thickness of the support portion 33. The degree of recess in the surface of the cam cap 40 is also adjusted by the same manner.

Next, a second embodiment of the disclosure will be described with reference to FIG. 9 and FIG. 10. Note that descriptions overlapping with those in the first embodiment will be omitted as appropriate.

The configuration of an engine will be described. FIG. 9 is a perspective view showing a main part of an engine according to the second embodiment. FIG. 10 is a schematic sectional view showing the end of the camshaft to which the VVT is attached and a portion in the vicinity of the end of the camshaft. The respective directions of the x-axis, the y-axis, and the z-axis shown in FIG. 9 are the same as the respective directions of the axes shown in FIG. 1 to FIG. 4. In FIG. 10, attention is focused on the camshaft 20 shown in FIG. 9, as well as in FIG. 5.

Figure 9:
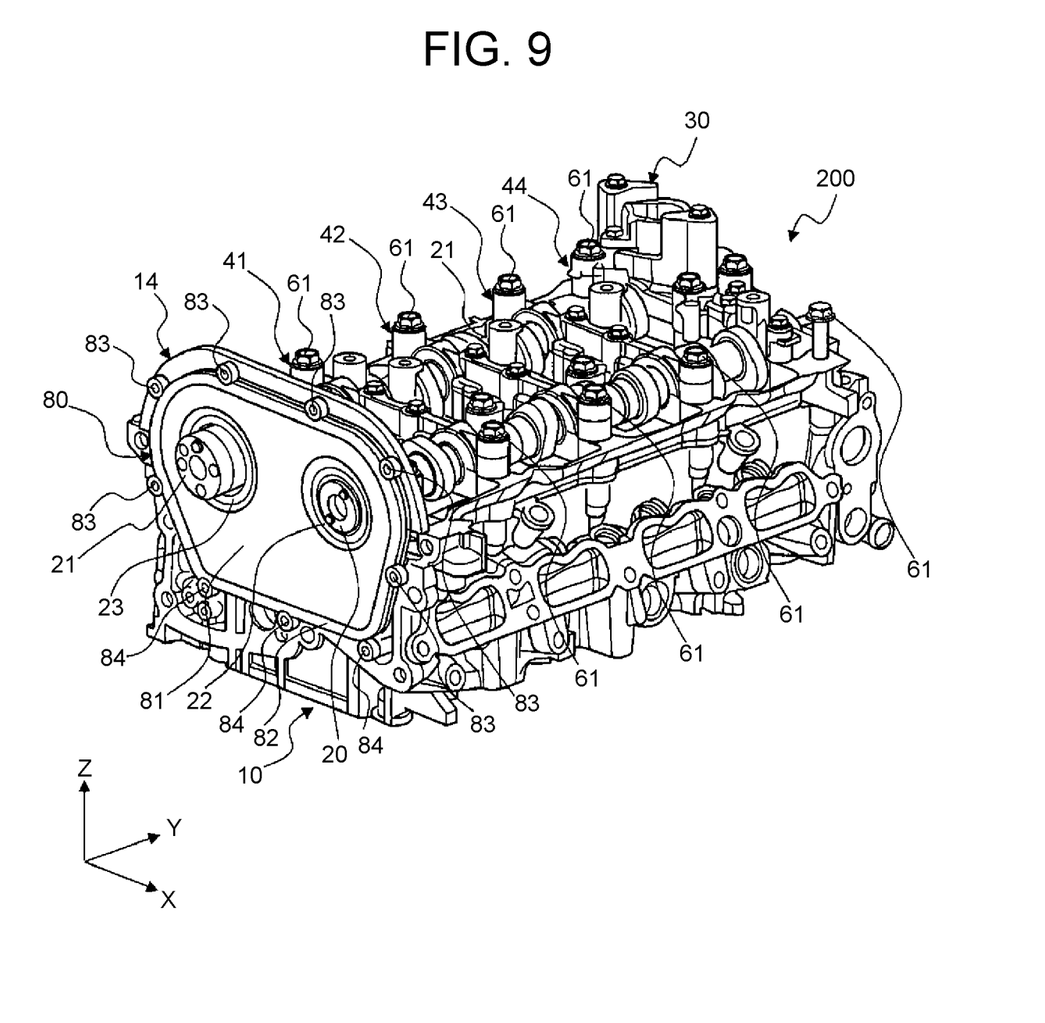
FIG. 9 is a perspective view showing a main part of an internal combustion engine according to a second embodiment of the disclosure.

As shown in FIG. 9, the engine 200 includes the cylinder head 10, camshafts 20, 21, the cam housing 30, cam caps 41 to 44, and an oil seal retainer 80. In FIG. 9, a part of the cylinder head cover 14 is disclosed, for convenience of explanation.

The engine 200 does not include the support portion 33, the outer peripheral portion 34, or the cam cap 40, unlike the engine 100. Instead of the support portion 33 and the outer peripheral portion 34, the engine 200 includes a support portion 36 as a facing member of the cam housing 30 (see FIG. 10). The shape of the support portion 36 is substantially the same as that of the support portion 33. Instead of the cam cap 40, the engine 200 includes a cam cap 47 (see FIG. 10). The shape of the cam cap 47 is substantially the same as that of the cam cap 41.

The oil seal retainer 80 is a member that holds the oil seal 22 and an oil seal 23. The oil seal 22 has been already described. The oil seal 23 is a ring-shaped member configured to prevent the lubricating oil provided in the cylinder head cover 14 from leaking to the outside of the cylinder head cover 14 through a gap formed between the end of the camshaft 21 and the support portion 36 (or the cam cap 47).

Figure 10:
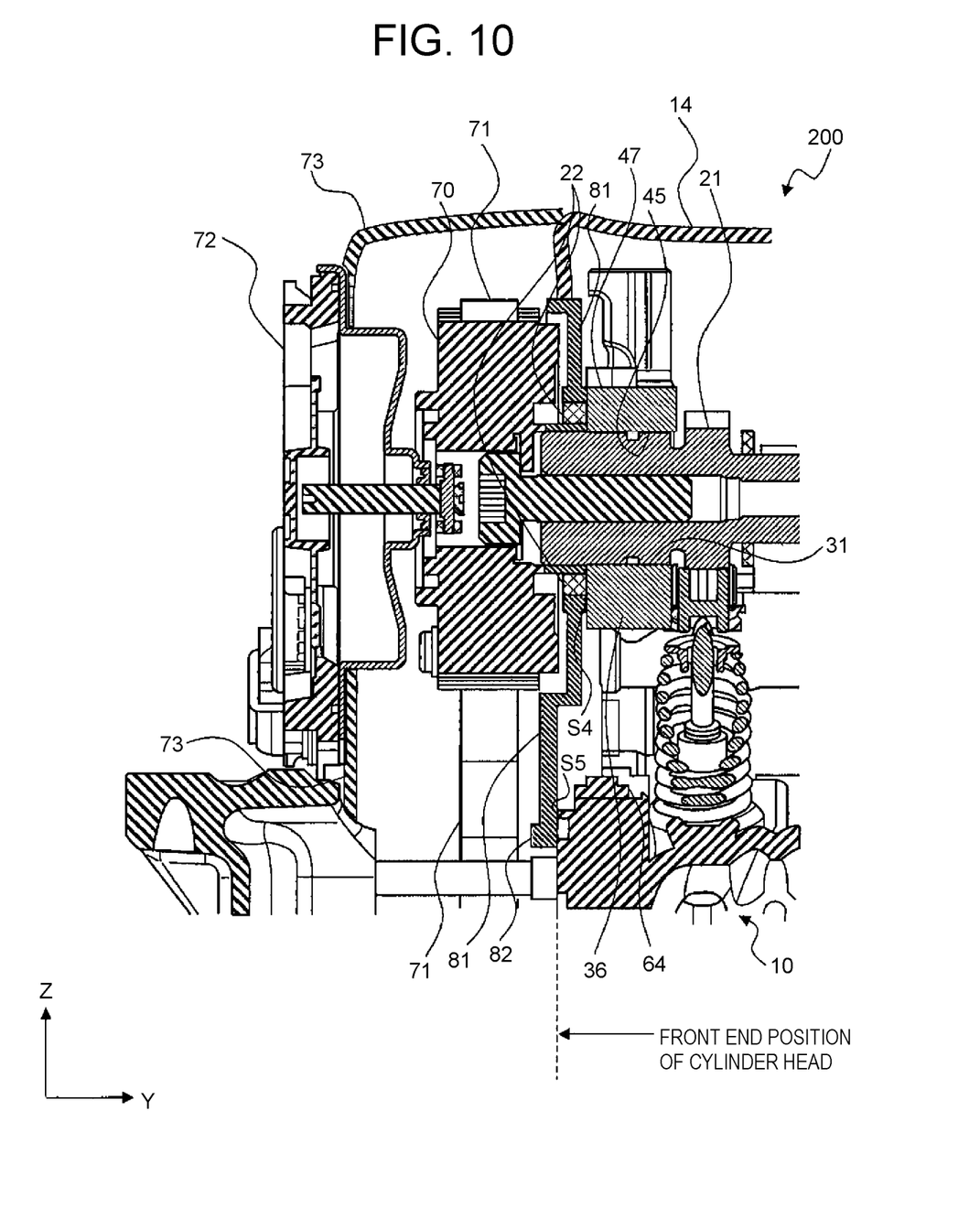
FIG. 10 is a schematic sectional view showing an end of a camshaft to which a VVT is provided, and a portion in the vicinity of the end of the camshaft.

As shown in FIG. 9 and FIG. 10, the oil seal retainer 80 includes a holding portion 81 that holds the oil seals 22, 23, and a fixing portion 82. The fixing portion 82 fixes the oil seal retainer 80 to the cylinder head cover 14 and the cylinder head 10. The fixing portion 82 has a plurality of bolt holes 83, 84. Bolts (not shown) are fitted into the respective bolt holes 83, 84 from the side of the VVT 70. The center of each bolt hole 84 coincides with the center of the corresponding bolt hole 13 (see FIG. 2).

As shown in FIG. 10, a central portion of the holding portion 81 is in contact with the support portion 36 and the cam cap 47 via a liquid gasket, for example. The contact surface between this central portion and the support portion 36 forms a seal surface S4 between the oil seal retainer 80 and the support portion 36. Further, a lower end of the fixing portion 82 is in contact with the cylinder head 10 via a liquid gasket, for example. This contact surface forms a seal surface S5 between the oil seal retainer 80 and the cylinder head 10. As the seal surfaces S4, S5 are thus formed, the gap formed between the cylinder head 10 and the cam housing 30 (a space in which the bolt 64 is accommodated in the example of FIG. 10) is sealed. That is, the oil seal retainer 80 also functions as a seal member.

Further, as can be seen from FIG. 10, a partial region in the surface of the holding portion 81 is recessed from the seal surface S5 in the positive direction of the y-axis. The region is located above the seal surface S5 (hereinafter, the region is also referred to as a "region inward of the seal surface S5"). A part of the VVT 70 is provided in this recessed space.

Effects of the configuration of the engine will be described. With the configuration of the engine 200 including the oil seal retainer 80, the sealing between the cylinder head and the cam housing is performed in the y-axis direction (in other words, the sealing between the cylinder head and the cam housing in the y-axis direction is provided). Therefore, it is possible to obtain the same effects as the effects of the configuration of the engine 100.

The engine described in the above embodiments can be modified as follows.

In the above embodiments, the "support structure" for the camshaft including a combination of the cam housing and the cam cap is applied to the engine. However, any support structure provided above the cylinder head and configured to support the camshaft can be applied to the engine according to the disclosure.

Figure 11:
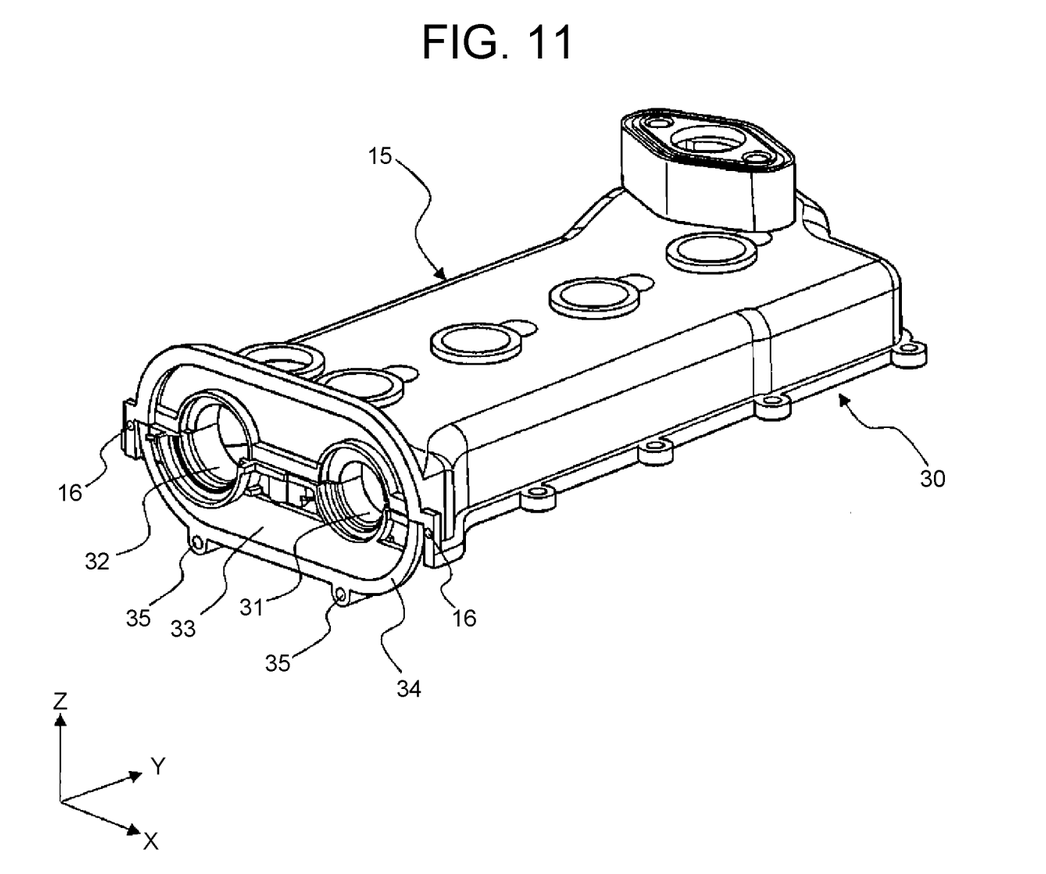
FIG. 11 is a perspective view showing another example of a support structure for the camshaft.

FIG. 11 is a perspective view explaining another example of the support structure of the camshaft. In this example, the cam housing 30 is integrated with a cylinder head cover 15. A member of the cylinder head cover 15, which forms the VVT facing surface, has the function of the cam cap 40 described in the first embodiment. The surface of this member is provided with two bolt holes 16. The bolts 63 (see FIG. 1) are fitted into the bolt holes 16, 35 from the side of the cover member 50 (see FIG. 1).

In the above embodiment, a large range of the region in the surface of the support portion 33 or the holding portion 81 is recessed in the positive direction of the y-axis. However, only a region slightly larger than the outer diameter of the VVT may be recessed. That is, at least only a region facing the VVT may be recessed.

What is claimed is:

1. An internal combustion engine comprising:
   a cylinder head;
   a support structure arranged above the cylinder head and configured to support a camshaft;
   a cam pulley provided at an end of the camshaft, a timing belt being wound around the cam pulley; and
   a seal member configured to cover a gap between the cylinder head and the support structure at a facing surface of the support structure facing the cam pulley, the seal member providing sealing between the cylinder head and the support structure in an axial direction of the camshaft.

2. The internal combustion engine according to claim 1, wherein:
   the support structure includes a facing member forming a part of the facing surface;
   the facing member includes a support portion that supports the camshaft from a side of the cylinder head, and an outer peripheral portion configured to extend along an outer periphery of the support portion;

a seal surface of the seal member is between the seal member and the outer peripheral portion;

the seal surface is at a position at which does not interfere with the cam pulley in the axial direction; and in a surface of the support portion, at least a region facing the cam pulley is recessed from the seal surface in the axial direction, and at least a part of the cam pulley is in a recessed space of the support portion.

3. The internal combustion engine according to claim 2, wherein a second seal surface of the seal member is between the seal member and the cylinder head.

4. The internal combustion engine according to claim 1, further comprising an oil seal on an outer periphery of the end of the camshaft, wherein:

the seal member includes an oil seal retainer that holds the oil seal;

the oil seal retainer includes a holding portion on an outer periphery of the oil seal, and a fixing portion on an outer periphery of the holding portion and fixed to the facing surface;

a seal surface of the seal member is between the fixing portion and the cylinder head;

the seal surface is at a position at which does not interfere with the cam pulley in the axial direction;

in a surface of the holding portion, at least a region facing the cam pulley is recessed from the seal surface in the axial direction of the camshaft; and at least a part of the cam pulley is in a recessed space of the holding portion.

5. The internal combustion engine according to claim 1, wherein the cam pulley adjusts a valve timing.

* * * * *